US008416121B2

(12) United States Patent
Chen et al.

(10) Patent No.: US 8,416,121 B2

(45) Date of Patent: Apr. 9, 2013

(54) NARROW-BAND WIDE-RANGE FREQUENCY MODULATION CONTINUOUS WAVE (FMCW) RADAR SYSTEM

(75) Inventors: Howard H. Chen, Yorktown Heights, NY (US); Kai D. Feng, Hopewell Junction, NY (US); Duixian Liu, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 174 days.

(21) Appl. No.: 12/963,314

(22) Filed: Dec. 8, 2010

(65) Prior Publication Data

US 2012/0146845 A1 Jun. 14, 2012

(51) Int. Cl.
*G01S 7/28* (2006.01)

(52) U.S. Cl.
USPC .............. 342/70; 342/103; 342/128; 342/196

(58) Field of Classification Search .............. 342/70–72, 342/103, 128, 175, 195–196
See application file for complete search history.

(56) References Cited

U.S. PATENT DOCUMENTS

| | | | | |
|---|---|---|---|---|
| 5,023,618 | A | 6/1991 | Reits | |
| 5,276,716 | A * | 1/1994 | Wincn | 375/376 |
| 5,534,828 | A * | 7/1996 | Okada et al. | 332/103 |
| 5,596,325 | A | 1/1997 | Maas | |
| 5,696,795 | A * | 12/1997 | Williams et al. | 375/308 |
| 5,757,311 | A | 5/1998 | Voyce | |
| 6,798,373 | B2 | 9/2004 | Kishida | |
| 7,250,823 | B2 | 7/2007 | Shields | |
| 7,538,622 | B2 * | 5/2009 | Feng | 331/16 |
| 7,884,675 | B2 * | 2/2011 | Chien | 331/16 |
| 2008/0208541 | A1 * | 8/2008 | Cesky et al. | 703/1 |
| 2009/0243676 | A1 * | 10/2009 | Feng | 327/157 |
| 2012/0025881 | A1 * | 2/2012 | Ding et al. | 327/157 |
| 2012/0146845 | A1 * | 6/2012 | Chen et al. | 342/200 |

OTHER PUBLICATIONS

B. N. Biswas, "Software defined active microstrip patch antenna receiver," Microwave Conference Proceedings, APMC 2005. Asia-Pacific Conference, Dec. 4-7, 2005.

S. Scheiblhofer, S. Schuster, and A. Stelzer, "High-Speed FMCW Radar Frequency Synthesizer With DDS Based Linearization," IEEE Microwave and Wireless Components Letters, vol. 17, Issue 5, May 2007 pp. 397-399.

Y.-O.Yam and K.-H.Wong, "Innovative demodulation method for SSB technique," IEE Proc.-Circuits Devices Syst.. vol. 146, No. 3, Jun. 1999.

H.-M Seo, et al., "A Single Sideband RF-Modulator for Digital-IF Transmitter," IEEE Microwave and Wireless Components Letters, vol. 18, No. 12, Dec. 2008 pp. 821-823.

Stephen Max, et al., "Fusion of FMCW Secondary Radar Signal Beat Frequency and Phase Estimations for High Precision Distance Measurement," Proceedings of the 5th European Radar Conference, Oct. 2008, pp. 124-127.

* cited by examiner

*Primary Examiner* — John B Sotomayor

(74) *Attorney, Agent, or Firm* — F. Chau & Associates, LLC; Anne V. Dougherty, Esq.

(57) ABSTRACT

A frequency modulation continuous wave (FMCW) system includes a first memory receiving a clock signal and storing voltage digital values of I FMCW signals, a second memory receiving the clock signal and storing the voltage digital values of the Q FMCW signals, a first digital-to-analog converter (DAC) connected to the first memory and receiving the clock signal for converting the voltage digital values of the I FMCW signal to a first analog voltage, a second digital-to-analog converter (DAC) connected to the second memory and receiving the clock signal for converting the voltage digital values of the Q FMCW signal to a second analog voltage, an I low-pass filter connected to the first DAC smoothing the I FMCW signal and a Q low-pass filter connected to the second DAC smoothing the Q FMCW signal.

20 Claims, 3 Drawing Sheets

NARROW-BAND WIDE-RANGE FREQUENCY MODULATION CONTINUOUS WAVE (FMCW) RADAR SYSTEM

BACKGROUND

The present disclosure relates to processing Frequency Modulation Continuous Waves (FMCW), and more particularly to memory-based FMCW system.

FMCW is widely used in millimeter-wave forward-looking radar sensors for automobiles, e.g., for obstacle warning (OWR) or autonomous intelligent cruise control (AICC) functions.

BRIEF SUMMARY

According to an embodiment of the present disclosure, a frequency modulation continuous wave (FMCW) system includes a first memory receiving a clock signal and storing voltage digital values of I FMCW signals, a second memory receiving the clock signal and storing the voltage digital values of the Q FMCW signals, a first digital-to-analog converter (DAC) connected to the first memory and receiving the clock signal for converting the voltage digital values of the I FMCW signal to a first analog voltage, a second digital-to-analog converter (DAC) connected to the second memory and receiving the clock signal for converting the voltage digital values of the Q FMCW signal to a second analog voltage, an I low-pass filter connected to the first DAC smoothing the I FMCW signal and a Q low-pass filter connected to the second DAC smoothing the Q FMCW signal.

According to an embodiment of the present disclosure a phase-locked loop (PLL) synthesizer system includes a first PLL synthesizer outputting a I component signal, a second PLL synthesizer outputting a Q component signal, a first frequency multiplier connected to the first PLL synthesizer raising the first PLL synthesizer output frequency M times, a second frequency multiplier connected to the second PLL synthesizer raising the second PLL synthesizer output frequency M times, a direct current (DC) amplifier connected to mixed outputs of the first and second frequency multipliers, and an adjustable current source is connected to an output of the DC amplifier, wherein an output of the adjustable current source is sourcing current input to the second PLL synthesizer, the DC amplifier controlling the sourcing current to the second PLL synthesizer.

According to an embodiment of the present disclosure, a frequency modulation continuous wave system includes a phase-locked loop (PLL) synthesizer outputting carrier signals with a frequency of $f_c$ and having orthogonal phases, a frequency modulation continuous wave generator outputting a pair of frequency sweeping modulation signals $f_m$ having orthogonal phases, and a frequency divider, wherein the PLL synthesizer, the frequency modulation continuous wave generator and the frequency divider share a clock signal, the frequency divider divides the clock signal and outputs a Doppler frequency shift compensation signal $f_{dc}$. The frequency modulation continuous wave system further includes a high side band mixer mixing the carrier signals $f_c$ and the frequency sweeping modulation signals $f_m$ and generating a modulated output signal having a frequency of $f_c+f_m$, a transmitting antenna transmitting the modulated output signal. The frequency modulation continuous wave system further includes a receiver antenna receiving a reflection signal corresponding to the modulated output signal, a low noise amplifier (LNA) amplifying the reflection signal, a first mixer mixing the carrier signals $f_c$ with the reflection signal and outputting a mixed signal, a first low pass filter (LPF) filtering the mixed signal and outputting a component of the mixed signal, a second mixer mixing the component of the mixed signal $f_{dc}$ and an output of a third mixer mixing the Doppler frequency shift compensation signal and the frequency sweeping modulation signals $f_m$, the second mixer outputting an output signal having two frequencies, a second LPF filtering the output signal and outputting a filtered output signal, an analog to digital converter converting the filtered output signal to a digital signal, and a digital signal processor sampling the digital signal to determine a distance to a target.

According to an embodiment of the present disclosure, a method includes receiving a reflection signal reflected by a target, the reflection signal corresponding to a modulated output signal generated by a Frequency Modulation Continuous Wave (FMCW) system, mixing carrier signals $f_c$ generated by a phase-locked loop synthesizer of the FMCW system with the reflection signal and outputting a mixed signal, mixing a component of the mixed signal and a mixture of a Doppler frequency shift compensation signal $f_{dc}$ generated by a frequency divider of the FMCW system and frequency sweeping modulation signals $f_m$ generated by a frequency modulation continuous wave generator of the FMCW system to create an output signal having two frequencies, filtering the output signal and outputting a filtered output signal, converting the filtered output signal to a digital signal, and sampling the digital signal to determine a distance to the target.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
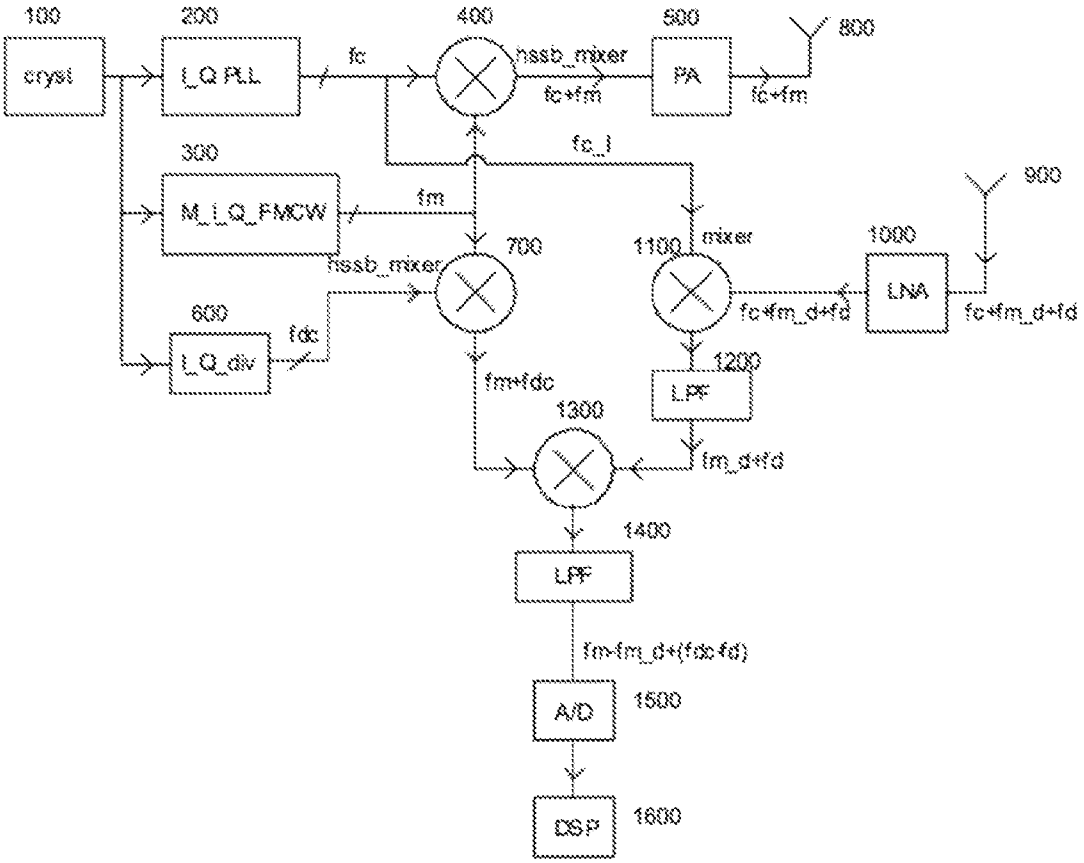
FIG. 1 is a diagram of a system according to an embodiment of the present disclosure.

Frequency Modulation Continuous Waves (FMCW) for obstacle warning (OWR) or autonomous intelligent cruise control (AICC) functions typically operates in the frequency range from 76 GHz to 77 GHz. FMCW uses variations in a modulation frequency of a transmitting signal, sweeping linearly over time, in detecting the object distance. More particularly, the modulation frequency of the transmitting signal may be expressed as:

$$f_{m\_tran}(t) = f_{min} + \frac{f_{max} - f_{min}}{T_{fmcw}} * t = f_{min} + K_{fmcw} * t \quad (1)$$

where:

$f_{min}$ is the minimum modulation frequency, $f_{max}$ is the maximum modulation frequency, $T_{fmcw}$ is the sweeping period of time, $K_{fmcw}$ is the sweeping ratio, and $$K_{fmcw} = \frac{f_{max} - f_{min}}{T_{fmcw}}$$

The modulation frequency in a reflected signal (e.g., the signal reflected by a target object) may be expressed as:

$$f_{m\_ref}(t) = f_{min} + K_{fmcw} * (t - t_d) \quad (2)$$

where:

$t_d$ is the delay time, $$t_d = \frac{2 * D}{V_{em}} \quad (3)$$

where:

D is the distance between a radar antenna and the object, and $V_{em}$ is the traveling speed of the electromagnetic signal in the air.

A beep frequency $f_{beep}$ may be determined as the difference of $f_{m\_tran}(t)$ and $f_{m\_ref}(t)$ $$f_{beep} = f_{m\_tran}(t) - f_{m\_ref}(t) = K_{fmcw} * t_d \quad (4)$$

For a fixed distance D, the beep frequency is constant. From equations (3) and (4)

$$f_{beep} = K_{fmcw} * \frac{2 * D}{V_{em}} \quad (5)$$

or $$D = \frac{f_{bep} * V_{em}}{2 * K_{fmcw}}$$

Based on equation (5), a radar system can detect the object distance by measuring the beep frequency.

An exemplary memory-based FMCW generator according to an embodiment of the present disclosure may achieve a high resolution of about 0.2 meters (m) with a time step as small as about 1.33 ns. Accuracy of the exemplary memory-based FMCW generator can be about 0.25 m, with a detection range spanning a detection distance out to about 200 m and as close as about 0.25 m, which results in a dynamic ratio up to 800 for both the delay time and the beat frequency. Since the frequency range specified for automotive applications is typically limited to 1 GHz by government and the cars may be moving close to each other, a sweeping range of about ($f_{max}$−$f_{min}$) may be implemented to avoid the interference by random selection of frequency range. Car speeds of about 200 km/hour require the radar system to have a fast processing capability for handling a Doppler frequency shift of about 57 KHz.

According to an exemplary embodiment of the present disclosure, a frequency upper shift structure may be used to achieve the wide detection range for the beat frequency, where the minimum beat frequency may be lower than the Doppler frequency shift and/or lower than $$\frac{1}{T_{fmcw}}.$$

A narrow detection distance may increase the difficulty of measuring the beat frequency or increase the complexity of a digital signal process.

Moreover, a narrow chirp frequency range makes the $f_{min}$ low, such as a few MHz. When $f_{min}$ modulates the carrier frequency $f_c$ of 76.5 GHz, the sideband frequencies of $f_c$−$f_{min}$ and $f_c$+$f_{min}$ are close. It may be difficult to design a filter to filter a sideband frequency. According to an exemplary embodiment of the present disclosure, I-Q modulation is used to generate one sideband frequency only. The I-Q modulation is produced by a pair of I-Q carrier frequencies with the identical amplitude and a 90° phase difference. For example, dual PLL synthesizers may be implemented with a closed loop of I-Q adjustment that generates the amplitude-identical I-Q signals.

An exemplary memory-based FMCW generator is shown in FIG. 1. The memory-based FMCW generator comprises an off chip crystal oscillator 100 providing a stable and low phase noise clock signal to an I_Q PLL synthesizer 200, a M_I_Q_FMCW generator 300 and a frequency divide and I-Q signal generation module I_Q_div 600.

The I_Q PLL synthesizer 200 outputs carrier signals with a frequency of $f_c$ and orthogonal phases.

The M_I_Q_FMCW generator 300 outputs a pair of frequency sweeping modulation signals $f_m$ having orthogonal phases.

A high side band mixer 400 mixes carrier signals $f_c$ and frequency sweeping modulation signals $f_m$ and generates a signal of the frequency of $f_c$+$f_m$. The theory of the signal mixture is based on the following formula:

$$A_x * A_y * \sin(x) * \cos(y) + A_x * A_y * \cos(x) * \sin(y) = \frac{1}{2} * A_x * A_y * [\sin(x+y) + \sin(x-y)] + \frac{1}{2} * A_x * A_y * [\sin(x+y) - \sin(x-y)] = A_x * A_y \sin(x+y) \quad (6)$$

where $A_x$*sin(x) and $A_x$*cos(x) are the in-phase and quadrant of the carrier signals $f_c$, respectively. $A_y$*cos(y) and $A_y$*cos(y) are the in-phase and quadrant of the modulation signals $f_m$, respectively. The modulation result is the signal of the single high sideband frequency only if the in-phase and quadrant signals have the same amplitudes.

The modulated signal of the frequency $f_c$+$f_m$(t) is magnified by a power amplifier 500 and transmitted to the target through a transmitting antenna 800.

The receiver antenna 900 receives the reflection signal. The frequency of the received reflection signal is the sum of three components:

$$f_c + f_{m}\_d + f_d$$

where $f_c$ is the carrier frequency, $f_m$_d is the FMCW modulation signal with time delay of $t_d$ or $f_m$(t−$t_d$), and $f_d$ is the Doppler frequency shift.

The received reflection signal is amplified by a low noise amplifier (LNA) 1000 and mixed with the in-phase carrier frequency for a first demodulation in a mixer 1100 (referred to herein as the first mixer). The output of the first mixer 1100 comprises two frequencies $f_m(t-t_d)+f_d$ and $2f_c+f_m(t-t_d)+f_d$, with the second frequency component being filtered out by a low pass filter (LPF) 1200 (referred to herein as the first LPF). Therefore, the output of the first LPF 1200 contains only the frequency of $f_m(t-t_d)+f_d$.

The frequency divide and I_Q_div 600 divides the crystal output frequency to generate the I-Q signal of 70 KHz, which is the Doppler frequency shift compensation signal $f_{dc}$.

Similar to the operation the high side band mixer 400, the I-Q signals of FMCW and the I-Q signals of $f_{dc}$ are mixed in a mixer unit 700 (referred to herein as the second mixer), which generates a shifted FMCW signal of the frequency of $f_m(t)+f_{dc}$.

The shifted FMCW signal and the output of the first LPF 1200 are mixed in a mixer 1300 (referred to herein as the third mixer) for the second demodulation. The output signal of the third mixer 1300 has the frequencies of $f_m(t)-f_m(t-t_d)+f_{dc}-f_d$ and $f_m(t)+f_m(t-t_d)+f_{dc}+f_d$, with the second frequency component filtered out by a low pass filter 1400 (referring to herein as the second LPF). As a result, the frequency of $f_m(t)-f_m(t-t_d)+f_{dc}-f_d$ or $f_{beat}+f_{dc}-f_d$ is the frequency output of the second LPF 1400. The term $f_{dc}$ eliminates the possibility of a negative value for $f_m(t)-f_m(t-t_d)+f_{dc}-f_d$.

Since $f_{dc}$ is known, $f_d$ can be found as the beat frequency difference during FMCW sweeping up and sweeping down operations. The sweeping operations are linear frequency increases or decreases over bandwidth in time, as referred to herein as chirps. The target distance can be found by sampling the output of the second LPF 1400, an analog to digital converter unit 1500 and a digital signal process unit 1600.

According to an exemplary embodiment of the present disclosure, the I-Q PLL synthesizer 200 outputs a pair of the in-phase output and the quadrant output having a 90° phase difference. More particularly, dual PLL synthesizers with a DC phase shift current and a closed loop feedback maintain a phase orthogonal output.

Figure 2A:
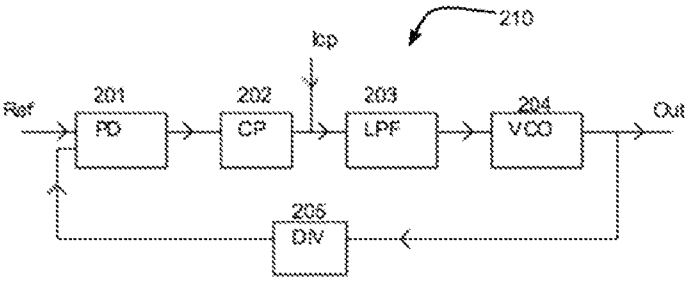
FIG. 2A is a block diagram a phase-locked loop (PLL) synthesizer according to an embodiment of the present disclosure.

A block diagram of an embodiment of a PLL synthesizer 210 according to an exemplary embodiment of the present disclosure is shown in FIG. 2A. PLL synthesizer 210 comprises a phase detector (PD) 201, a charge pump (CP) 202, a loop filter (LPF) 203 and a voltage control oscillator (VCO) 204 connected in series. The PLL synthesizer 210 further comprises a frequency divider (DIV) 205 connected in parallel with the phase detector (PD) 201, the charge pump (CP) 202, the loop filter (LPF) 203 and the voltage control oscillator (VCO) 204.

Conventionally, a PLL synthesizer has only an input reference signal and an output signal. The I-Q PLL 210 according to an exemplary embodiment of the present disclosure comprises an input current $I_{cp}$ connected the output of the CP 202 for performing a phase shift adjustment.

It is well known that when a PLL synthesizer is in a locking status, the average current from a CP to an LPF in one reference signal period is zero. According to an exemplary embodiment of the present disclosure, an external current sinking current $I_{cp}$ is added to the LPF input and the CP provides a pulsed sourcing current to balance $I_{cp}$:

$$I_{cp0}*\frac{\tau}{T_{ref}}=I_{cp}\text{ or }\frac{\tau}{T_{ref}}=\frac{I_{cp}}{I_{cp0}} \tag{7}$$

where:

$I_{cp0}$ is the reference current of the charge pump, $\tau$ is the width of the sourcing current pulse, and $T_{ref}$ is the period of the reference signal. The sourcing pulse with the pulse width of $\tau$ makes the PLL output edge shift of $\tau$, which is equivalent to the phase shift of:

$$\phi=\frac{\tau}{T_{out}}*360°=\frac{I_{cp}}{I_{cp0}}*N*360° \tag{8}$$

where:

$T_{out}$ is the period of a PLL synthesizer output signal and

N is the frequency divide ratio.

Therefore, the PLL synthesizer 210 output phase is tunable by adjusting the DC sinking current of $I_{cp}$.

Figure 2B:
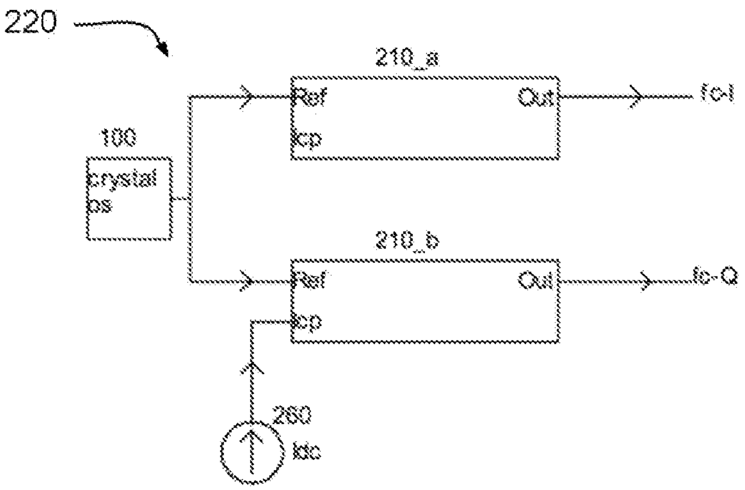
FIG. 2B is a block diagram a I-Q PLL synthesizer according to an embodiment of the present disclosure.

The block diagram an embodiment of an exemplary I-Q PLL synthesizer 220 is shown in FIG. 2B. In FIG. 2B, the off chip crystal oscillator 100 is connected to two PLL synthesizers 210_a and 210_b, which have the structure of the PLL synthesizer 210 shown in FIG. 2A. PLL synthesizers 210_a and 210_b share the same reference signal. The off chip crystal oscillator 100 and the PLL synthesizers 210_a and 210_b may take the same charge pump reference current $I_{cp0}$ as input. The input of $I_{cp}$ for PLL synthesizer 210_a is floating, while the input of $I_{cp}$ of PPL synthesizer 210_b is connected to a DC sourcing current $I_{cp}$, of unit 260. When $$I_{cp}=\frac{I_{cp0}}{4*N},$$

the phase of 210_b output is 90 degrees ahead of the phase of 210_a output.

Figure 2C:
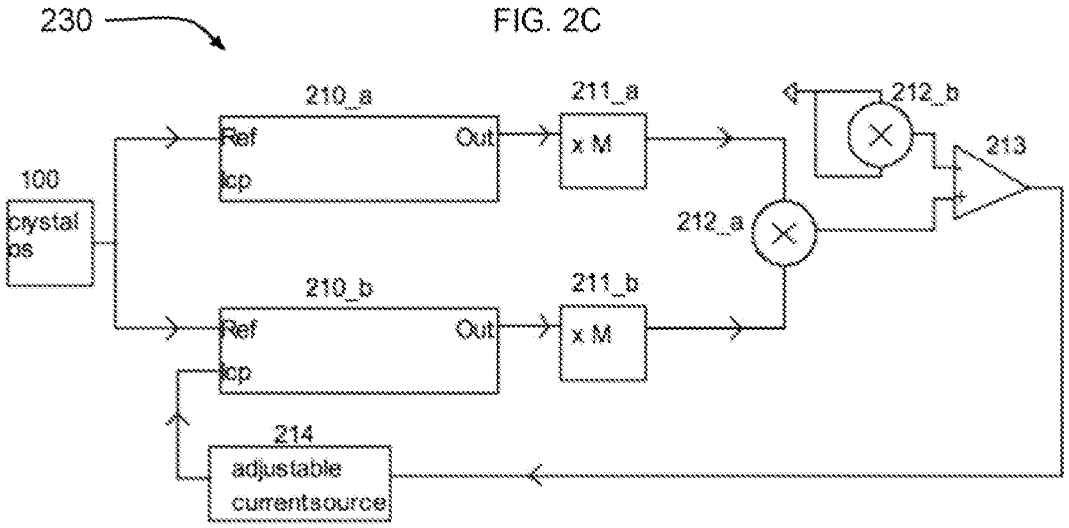
FIG. 2C is a block diagram of a closed loop based I-Q mismatching correction according to an embodiment of the present disclosure.

The block diagram of a closed loop based I-Q PLL system 230 is shown in FIG. 2C. For some applications, the PLL synthesizer 200 operates at a frequency lower than the carrier frequency required. In this case a frequency multiplier may be used to raise the output frequency of the PLL synthesizers 210_a and 210_b to a required carrier frequency. The frequency multiplier may introduce unbalanced extra phase shift for the two PLL synthesizer output signals. Therefore, a closed loop phase adjustment unit may be needed. FIG. 2C is a block diagram of an exemplary closed loop based I-Q.

In FIG. 2C, PLL synthesizers 210_a and 210_b output I-Q signals. Two frequency multipliers 211_a and 211_b raise the PLL synthesizer output frequency M times. The closed loop based I-Q further includes two mixers 212_a and 212_b. A DC amplifier 213 is connected to outputs of the mixers 212_a and 212_b. An adjustable current source 214 is connected to an output of the DC amplifier 213.

When a pair of perfect I-Q signals is mixed in a mixer, the output of the mixer is a sinusoidal signal with the double frequency. However, when the pair of I-Q signals are not perfect, they can be represented by $\sin(2\pi ft)$ and $\cos(2\pi ft+\theta)$. When these two signals are mixed, the output signal will be:

$$\sin(2\pi ft)*\cos(2\pi ft+\theta)=\frac{1}{2}\sin(2\pi*(2f)t)+\vartheta)-\frac{1}{2}\sin(\vartheta) \tag{9}$$

In equation (9), the first signal has the double frequency, while the second signal is DC and proportional to $\theta$ when $\theta$ is small, which can be an indication of an off-orthogonal of I-Q signals.

The mixers 212_a and 212_b have the same DC operation points, so the output DC bias voltages are the same. The inputs of mixer 212_a are connected to the outputs of the frequency multipliers 211_a and 211_b, while mixer 212_b is a dummy unit.

When the outputs of the frequency multipliers 211_a and 211_b have an exact 90° phase difference, the output DC voltage of mixer 212_a is the same as that of mixer 212_b. When the output signals of the frequency multipliers 211_a and 211_b are not orthogonal, the DC output voltage difference between mixers 212_a and 212_b is $$\frac{1}{2}\sin(\vartheta),$$

which is amplified by the DC amplifier 213. The DC amplifier 213 is not sensitive to the AC signal represented by the first term in equation (9).

The output of the DC amplifier 213 is connected to the input of the adjustable current source 214 to control the sourcing current to PLL synthesizer 210_b. When θ is positive the DC amplifier 213 output decreases and the sourcing current to the adjustable current source 214 is decreased. When θ is negative the DC amplifier 213 output increases and the sourcing current to the DC amplifier 213 is increased.

Figure 2D:
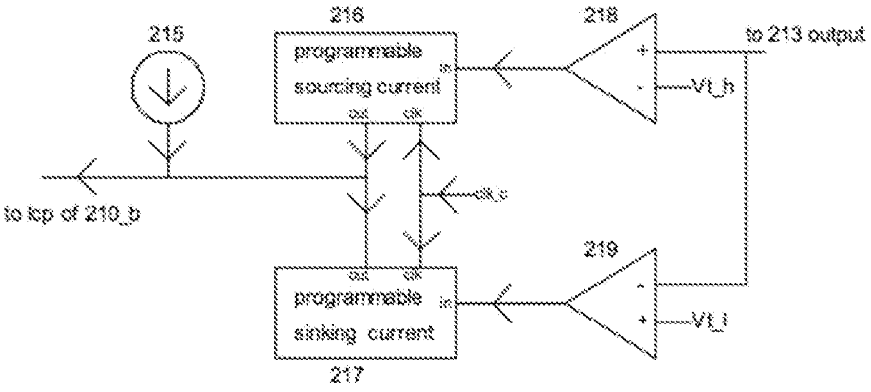
FIG. 2D is a block diagram of adjustable current source for I-Q mismatching correction according to an embodiment of the present disclosure.

The block diagram of an exemplary adjustable current source 214 is shown in FIG. 2D. In FIG. 2D, the adjustable current source 214 comprises a fixed sourcing current source 215 providing a DC sourcing current of $$I_{cp} = \frac{I_{cp0}}{4*N}.$$

The adjustable current source 214 further comprises a programmable sourcing current source 216, a programmable sink current source 217 and two voltage comparators 218 and 219 having two predefined thresholds Vt_h and Vt_l, respectively.

When the output voltage of the DC amplifier 213 is between Vt_h and Vt_l, the outputs of the voltage comparators 218 and 219 are at logic low, which will not activate the programmable sourcing current source 216 and the programmable sink current source 217.

When the output voltage of the DC amplifier 213 is higher than Vt_h, the output of voltage comparator 218 is at logic high, which activates the programmable sourcing current source 216. Under a clock signal clk_c, the programmable sourcing current source 216 incrementally increases the sourcing current for each clock, which increases the phase shift of the PLL synthesizer 210_b until the output voltage of the DC amplifier 213 is dropped to lower than Vt_h.

When the output voltage of the DC amplifier 213 is lower than Vt_l, the output of voltage comparator 219 is at logic high, which activates the programmable sink current source 217. Under the clock signal of clk_c, the programmable sink current source 217 incrementally increases the sinking current for each clock, which decreases the phase shift of PLL synthesizer 210_b until the output voltage of the DC amplifier 213 is raised to higher than Vt_l.

The period of the clock signal clk_c is longer than the time constant of the closed loop, and the closed loop will keep the PLL synthesizer outputs orthogonal.

Figure 3:
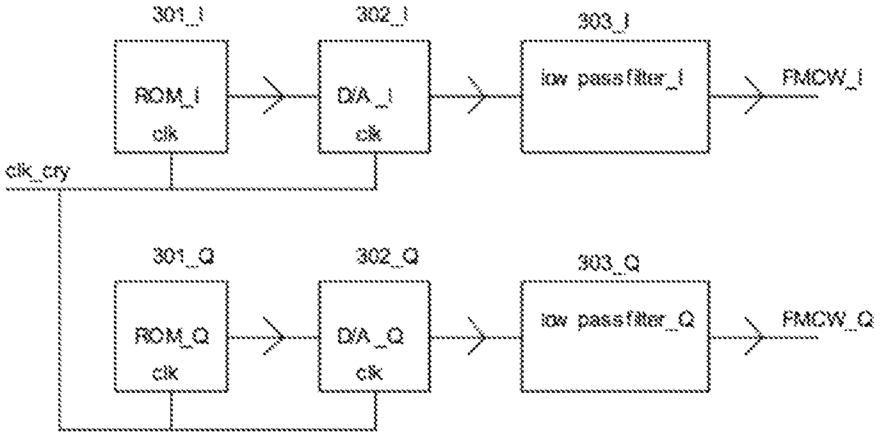
FIG. 3 is a memory-based FMCW according to an embodiment of the present disclosure.

An exemplary implementation of a memory-based FMCW according to the present disclosure is shown in FIG. 3. On-chip read-only memories (ROMs) 301_I and 301_Q save instant voltage values of I and Q FMCW signals. The I and Q FMCW signals may be respectively expressed as:

$$V_{fmcw\_I}(A) = \sin\left[2\pi*\left(f_{min} + \frac{f_{max} - f_{min}}{T_{fmcw}}(A*\Delta t)\right)*(A(\Delta t)\right] \quad (10)$$

$$V_{fmcw\_Q}(A) = \cos\left[2\pi*\left(f_{min} + \frac{f_{max} - f_{min}}{T_{fmcw}}(A*\Delta t)\right)*(A(\Delta t)\right] \quad (11)$$

where A is the address of the ROMs, and Δt is the time step.

If the distance detection resolution is about 0.2 meter, Δt can be about 1.33 ns. If the sweeping period is about 100 us, the memory size can be about 75 Kbytes. Clk_cry is the clock from a crystal oscillator, such as the crystal oscillator 100 in FIG. 1. The frequency of the clock is higher than 1/Δt.

Two digital-to-analog converters (DAC) 302_I and 302_Q convert the digital signal of the instant FMCW data on the ROMs to an analog voltage. Low-pass filters 303_I and 303_Q filter out steps in the analog signal, smoothing the steps.

A memory-based FMCW generator according to exemplary embodiments of the present disclosure achieves high resolution in time steps, high linearity over time, high stability and less variation.

The methodologies of embodiments of the invention may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
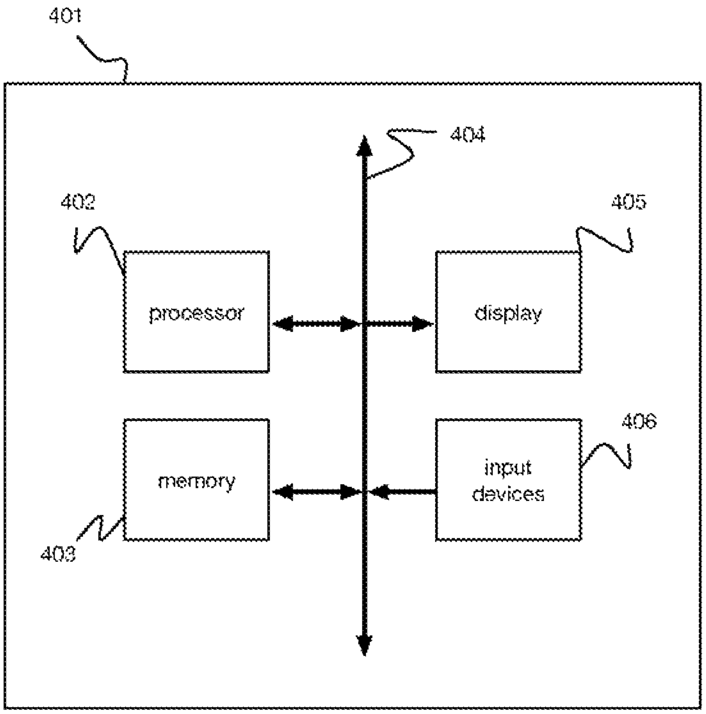
FIG. 4 is an exemplary memory-based FMCW generator according to an embodiment of the present disclosure.

For example, FIG. 4 is a block diagram depicting an exemplary memory-based FMCW generator 401. The exemplary memory-based FMCW generator 401 may include a processor 402, memory 403 coupled to the processor (e.g., via a bus 404 or alternative connection means), as well as input/output (I/O) circuitry 405-406 operative to interface with the processor 402. The processor 402 may be configured to perform one or more methodologies described in the present disclosure, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A frequency modulation continuous wave (FMCW) system comprising:

a first memory receiving a clock signal and storing voltage digital values of I FMCW signals;

a second memory receiving the clock signal and storing the voltage digital values of the Q FMCW signals;

a first digital-to-analog converter (DAC) connected to the first memory and receiving the clock signal for converting the voltage digital values of the I FMCW signal to a first analog voltage;

a second digital-to-analog converter (DAC) connected to the second memory and receiving the clock signal for converting the voltage digital values of the Q FMCW signal to a second analog voltage;

an I low-pass filter connected to the first DAC smoothing the I FMCW signal; and a Q low-pass filter connected to the second DAC smoothing the Q FMCW signal.

2. A phase-locked loop (PLL) synthesizer system comprising:

a first PLL synthesizer outputting a I component signal;

a second PLL synthesizer outputting a Q component signal;

a first frequency multiplier connected to the first PLL synthesizer raising the first PLL synthesizer output frequency M times;

a second frequency multiplier connected to the second PLL synthesizer raising the second PLL synthesizer output frequency M times;

a direct current (DC) amplifier connected to mixed outputs of the first and second frequency multipliers; and an adjustable current source is connected to an output of the DC amplifier, wherein an output of the adjustable current source is sourcing current input to the second PLL synthesizer, the DC amplifier controlling the sourcing current to the second PLL synthesizer.

3. The PLL synthesizer system of claim 2, further comprising a first mixer connected between the first and second frequency multipliers and the DC amplifier, the first mixer mixing outputs of the first and second frequency multiplier.

4. The PLL synthesizer system of claim 3, further comprising a second mixer connected to an input of the amplifier, the first and second mixers having the same DC operation points such that output DC bias voltages of the DC amplifier are the same.

5. The PLL synthesizer system of claim 2, wherein the adjustable current source comprises:

a first voltage comparator receiving the output of the DC amplifier and having a first threshold;

a second voltage comparator receiving the output of the DC amplifier and having a second threshold;

a programmable sourcing current source connected to the first voltage comparator and receiving a clock signal, the programmable sourcing current source controlling the sourcing current according to the output of the DC amplifier and the first threshold;

a programmable sink current source connected to the second voltage comparator and the programmable sourcing current source and receiving the clock signal, the programmable sink current source outputting a sink current according to the output of the DC amplifier and the second threshold; and a fixed sourcing current source providing the sourcing current, wherein a period of the clock signal is longer than a time constant of a closed loop comprising the first and second PLL synthesizes, wherein the closed loop maintains the PLL synthesizer outputs in an orthogonal state.

6. The PLL synthesizer system of claim 2, wherein the first and second PLL synthesizers are embodied in a frequency modulation continuous wave (FMCW) device comprising:

a first memory receiving a clock signal and storing voltage values of the I component signal;

a second memory receiving the clock signal and storing the voltage values of the Q component signal;

a first digital-to-analog converter (DAC) connected to the first memory and receiving the clock signal for converting the voltage values of the I component signal to a first analog voltage;

a second digital-to-analog converter (DAC) connected to the second memory and receiving the clock signal for converting the voltage values of the Q component signal to a second analog voltage;

an I low-pass filter connected to the first DAC smoothing the I component signal; and a Q low-pass filter connected to the second DAC smoothing the Q component signal.

7. A Frequency Modulation Continuous Wave (FMCW) system comprising:

a phase-locked loop synthesizer outputting carrier signals with a frequency of $f_c$ and having orthogonal phases;

a frequency modulation continuous wave generator outputting a pair of frequency sweeping modulation signals $f_m$ having orthogonal phases;

a frequency divider, wherein the phase-locked loop synthesizer, the frequency modulation continuous wave generator and the frequency divider share a clock signal, wherein the frequency divider divides the clock signal and outputs a Doppler frequency shift compensation signal $f_{dc}$;

a high side band mixer mixing the carrier signals $f_c$ and the frequency sweeping modulation signals $f_m$ and generating a modulated output signal having a frequency of $f_c+f_m$;

a transmitting antenna transmitting the modulated output signal;

a receiver antenna receiving a reflection signal corresponding to the modulated output signal;

a first mixer mixing the carrier signals $f_c$ with the reflection signal and outputting a mixed signal;

a first low pass filter (LPF) filtering the mixed signal and outputting a component of the mixed signal;

a second mixer mixing the component of the mixed signal and an output of a third mixer mixing the Doppler frequency shift compensation signal $f_{dc}$ and the frequency sweeping modulation signals $f_m$, the second mixer outputting an output signal having two frequencies;

a second LPF filtering the output signal and outputting a filtered output signal;

an analog to digital converter converting the filtered output signal to a digital signal; and a digital signal processor sampling the digital signal to determine a distance to a target.

8. The FMCW system of claim 7, wherein the modulated output signal is a single high sideband frequency, wherein in-phase and quadrant signals have the same amplitudes.

9. The FMCW system of claim 7, further comprising a power amplifier connected between the high side band mixer and the transmitting antenna magnifying the modulated output signal.

10. The FMCW system of claim 7, further comprising a low noise amplifier (LNA) amplifying the reflection signal.

11. The FMCW system of claim 7, wherein the mixed signal comprises two frequencies $f_m(t-t_d)+f_d$ and $2f_c+f_m(t-t_d)+f_d$, wherein $f_m(t-t_d)$ is a time delay of the modulation signal $f_m$.

12. The FMCW system of claim 11, wherein the first low pass filter (LPF) filters the $2f_c+f_m(t-t_d)+f_d$ frequency from the mixed signal and outputs the component of the mixed signal as $f_m(t-t_d)+f_d$, wherein $f_d$ is a Doppler frequency shift.

13. The FMCW system of claim 12, wherein the second mixer outputs an output signal having two frequencies $f_m(t)-f_m(t-t_d)+f_{dc}-f_d$ and $f_m(t)+f_m(t-t_d)+f_{dc}+f_d$.

14. The FMCW system of claim 13, wherein the second LPF filtering $f_m(t)+f_m(t-t_d)+f_{dc}+f_d$ from the output signal and outputs the filtered output signal having the frequency $f_m(t)-f_m(t-t_d)+f_{dc}-f_d$.

15. A method comprising:

receiving a reflection signal reflected by a target, the reflection signal corresponding to a modulated output signal generated by a Frequency Modulation Continuous Wave (FMCW) system;

mixing carrier signals $f_c$ generated by a phase-locked loop synthesizer of the FMCW system with the reflection signal and outputting a mixed signal;

mixing a component of the mixed signal and a mixture of a Doppler frequency shift compensation signal $f_{dc}$ generated by a frequency divider of the FMCW system and frequency sweeping modulation signals $f_m$ generated by a frequency modulation continuous wave generator of the FMCW system to create an output signal having two frequencies;

filtering the output signal and outputting a filtered output signal;

converting the filtered output signal to a digital signal; and sampling the digital signal to determine a distance to the target.

16. The method of claim 15, further comprising amplifying the reflection signal before mixing with the carrier signals $f_c$.

17. The method of claim 15, wherein the mixed signal comprises two frequencies $f_m(t-_d)+f_d$ and $2f_c+f_m(t-t_d)+f_d$, wherein $f_m(t-t_d)$ is a time delay of the modulation signal $f_m$.

18. The method of claim 17, further comprising filtering the $2f_c+f_m(t-t_d)+f_d$ frequency from the mixed signal and outputting the component of the mixed signal as $f_m(t-t_d)+f_d$, wherein $f_d$ is a Doppler frequency shift.

19. The method of claim 18, wherein the two frequencies of the output signal are $f_m(t)-f_m(t-t_d)+f_{dc}-f_d$ and $f_m(t)+f_m(t-t_d)+f_{dc}+f_d$.

20. The method of claim 19, further comprising filtering $f_m(t)+f_m(t-t_d)+f_{dc}+f_d$ from the output signal and outputting the filtered output signal having the frequency $f_m(t)-f_m(t-t_d)+f_{dc}-f_d$.

* * * * *